United States Patent
Wang

(10) Patent No.: US 8,041,913 B2
(45) Date of Patent: Oct. 18, 2011

(54) DATA PROTECTION METHOD

(75) Inventor: Chin-Yu Wang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 547 days.

(21) Appl. No.: 12/254,805

(22) Filed: Oct. 20, 2008

(65) Prior Publication Data

US 2009/0106517 A1  Apr. 23, 2009

(30) Foreign Application Priority Data

Oct. 23, 2007 (TW) ................................ 96139717 A

(51) Int. Cl.
  *G06F 12/14* (2006.01)
(52) U.S. Cl. ................. 711/164; 711/173; 711/E12.094
(58) Field of Classification Search .................. None
See application file for complete search history.

(56) References Cited

U.S. PATENT DOCUMENTS

| | | | | |
|---|---|---|---|---|
| 5,944,820 | A * | 8/1999 | Beelitz | 713/1 |
| 6,324,627 | B1 * | 11/2001 | Kricheff et al. | 711/163 |
| 6,507,905 | B1 * | 1/2003 | Hubacher et al. | 713/1 |
| 6,530,019 | B1 * | 3/2003 | Carroll | 713/2 |
| 7,111,203 | B2 | 9/2006 | Hu et al. | |
| 7,117,334 | B2 * | 10/2006 | Almeida et al. | 711/173 |
| 7,412,562 | B2 * | 8/2008 | Garney | 711/113 |
| 7,469,327 | B2 * | 12/2008 | Kawamura et al. | 711/163 |
| 2002/0103964 | A1 * | 8/2002 | Igari | 711/112 |
| 2003/0204754 | A1 | 10/2003 | Cromer et al. | |
| 2004/0268079 | A1 * | 12/2004 | Riedle et al. | 711/173 |
| 2005/0177698 | A1 * | 8/2005 | Ku et al. | 711/173 |
| 2006/0294298 | A1 * | 12/2006 | Peterson et al. | 711/112 |
| 2006/0294331 | A1 * | 12/2006 | Forrer et al. | 711/163 |
| 2007/0088927 | A1 * | 4/2007 | Rui et al. | 711/163 |
| 2007/0094470 | A1 * | 4/2007 | Haustein et al. | 711/163 |
| 2009/0248966 | A1 * | 10/2009 | Crandell | 711/103 |
| 2009/0300020 | A1 * | 12/2009 | Chen et al. | 707/9 |

* cited by examiner

*Primary Examiner* — Matt Kim
*Assistant Examiner* — Ralph A Verderamo, III
(74) *Attorney, Agent, or Firm* — Jianq Chyun IP Office

(57) ABSTRACT

A data protection method for an electronic device having a storage medium is provided, wherein the storage medium includes a plurality of partitions and a partition table. In the data protection method, a partition entry point and a partition data corresponding to the specific partition are captured and sent to an external storage device when the electronic device enters a shutdown process. Then, the partition entry point is deleted from the partition table and the partition data is removed from the storage medium. When the electronic device is turned on, a user has to provide the corresponding external storage device to restore the partition entry point and the partition data back to the storage medium. Thereby, personal data stored in the storage medium is protected and accordingly data security is ensured.

19 Claims, 3 Drawing Sheets

DATA PROTECTION METHOD

CROSS-REFERENCE TO RELATED APPLICATION

This application claims the priority benefit of Taiwan application serial no. 96139717, filed on Oct. 23, 2007. The entirety of the above-mentioned patent application is hereby incorporated by reference herein and made a part of this specification.

BACKGROUND OF THE INVENTION

1. Field of the Invention

The present invention generally relates to a data protection method, and more particularly, to a data protection method for protecting personal data when a same electronic device is shared by multiple users.

2. Description of Related Art

Along with the development of technologies and the widespread of computer systems, more and more people use computer systems to process documents, browse the Internet, play audio/video files, or store data, and accordingly computer systems have become one of the most indispensable tools in our daily life. Various mechanisms for preventing others from viewing or using data stored in a computer system have been developed in order to protect the privacy of users of the computer system.

Generally speaking, a user can set up a hard disk password for protecting the data stored in a hard disk. The user can enter the basic input/output system (BIOS) when a computer system boots up and selects the corresponding menu item to set the hard disk password. The password set by the user is sent as a packet to a hard disk controller, and the computer system will require the user to enter this password when next time the computer system is turned on. The user can only access the data stored in the hard disk when he/she enters a correct password. If the user does not enter a correct password, the hard disk is then locked and accordingly the computer system cannot read any data stored in the hard disk.

Data protection becomes more important when a same computer system is shared by multiple users. To prevent others from opening, altering, or even deleting personal files, a file security mechanism is provided by an operating system and this file security mechanism allows each user to access only part of the data. When a user is about to use a computer system, the user has to input a personal password to be authorized to access the hard disk. For example, three users A, B, and C share a computer system, namely, all the personal data of these three users is stored in the hard disk of the computer system. FIG. 1 is a diagram of a file system of the computer system. As shown in FIG. 1, the file system 100 has a tree structure, wherein the root directory 110 of the file system 100 includes a shared directory 120, a directory A 130, a directory B 140, and a directory C 150, and foregoing four directories respectively include a plurality of directories and/or files. When the user A logs into the computer system with his/her password, the user A can only see and access the directories and/or file in the directory A 130 and the shared directory 120. Similarly, when the users B and C log into the computer system, they cannot see or access the directories and/or files in the directories exclusive to the other users. In other words, even though the data of all the users is stored in the hard disk, a user logged into the computer system can only access the data stored in specific directories.

SUMMARY OF THE INVENTION

Accordingly, the present invention is directed to a data protection method, wherein data stored by a user in an electronic device is protected when the electronic device is shared by multiple users.

The present invention provides a data protection method for an electronic device having a storage medium, wherein the storage medium includes a plurality of partitions and a partition table. First, the electronic device is entered into a hibernation process or a shutdown process. Then, a partition entry point and a partition data corresponding to the specific partition are captured and sent to an external storage device. Finally, the partition entry point is deleted from the partition table, and the partition data is removed from the storage medium.

According to an embodiment of the present invention, the data protection method further includes receiving an account password input by a user to log into the electronic device before the step of entering the electronic device into the hibernation process or the shutdown process, and the specific partition includes a partition accessible only to the user who logs into the electronic device.

According to an embodiment of the present invention, the step of capturing the partition entry point and the partition data corresponding to the specific partition includes obtaining the partition entry point recorded in the partition table and obtaining the partition data recorded in the partition according to the partition entry point.

According to an embodiment of the present invention, the step of removing the partition data from the storage medium includes replacing a content of the partition data with a predetermined symbol. The data protection method further includes sending the predetermined symbol to the external storage device.

According to an embodiment of the present invention, the data protection method further includes sending a partition number of the specific partition and a check sum corresponding to the partition data to the external storage device.

The present invention further provides a data protection method for an electronic device having a storage medium. First, an external storage device recording a partition entry point and a partition data is provided. Then, an account password input by a user is received to allow the electronic device to execute a wake-up process or a boot-up process. Next, whether the partition entry point and the partition data conform to the partition accessibly only to the user is determined, and if so, the partition entry point and the partition data are written into the storage medium.

According to an embodiment of the present invention, the external storage device further records a partition number corresponding to the partition entry point. After the account password input by the user is received, the partition accessible only to the user in the storage medium is determined according to the account password. It is determined that the partition entry point and the partition data conform to the partition accessible only to the user if the partition number conforms to the partition. Besides, the step of writing the partition entry point and the partition data into the storage medium includes writing the partition entry point into the partition table of the storage medium and writing the partition data into the partition of the storage medium according to the partition entry point. The present embodiment further includes loading an operating system into the electronic device after foregoing steps are completed.

According to an embodiment of the present invention, the external storage device further records a predetermined symbol. After the account password input by the user is received, the partition accessible only to the user is determined in the storage medium according to the account password. Then, whether the predetermined symbol is recorded in the partition is checked. Whether the partition entry point and the partition data conform to the partition accessible only to the user is further determined if the predetermined symbol is recorded in the partition.

According to an embodiment of the present invention, the external storage device further records a check sum corresponding to the partition data. The step of writing the partition entry point and the partition data into the storage medium includes checking the correctness of the partition data according to the check sum.

According to an embodiment of the present invention, the data protection method further includes loading an operating system into the electronic device when it is determined that the partition entry point and the partition data do not conform to the partition accessible only to the user.

In the present invention, when a user turns off an electronic device, a partition data and a partition entry point corresponding to a partition which is accessible only to the user are copied into an external storage device, and the partition data and the partition entry point are deleted from the storage medium. Thereby, when a user who shares the same electronic device with other users log into the electronic device, the user cannot see or access any data stored by other users but can only access the authorized partition thereof. As a result, the security of personal data is ensured.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
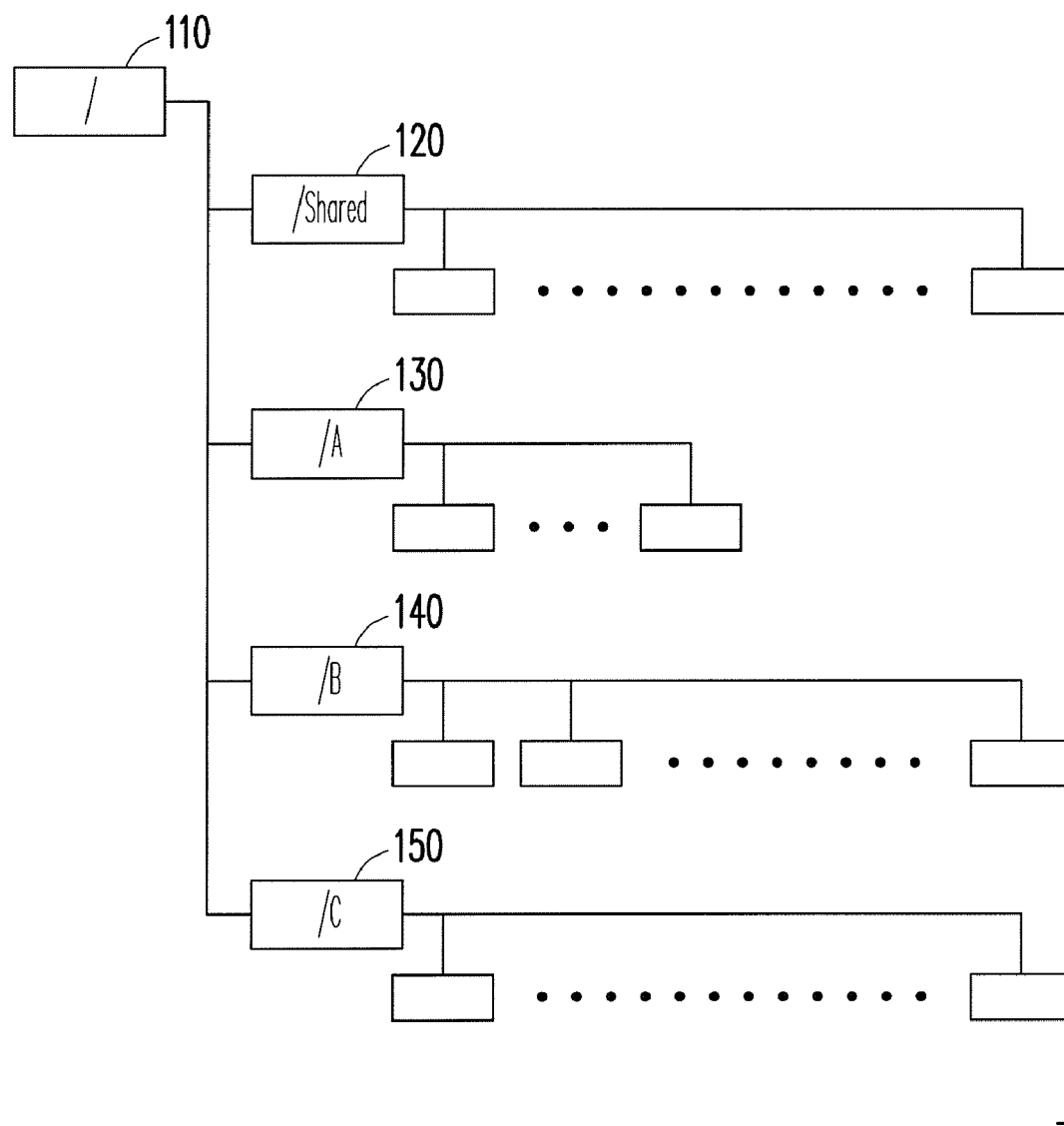
FIG. 1 is a diagram of a conventional file system.

Reference will now be made in detail to the present preferred embodiments of the invention, examples of which are illustrated in the accompanying drawings. Wherever possible, the same reference numbers are used in the drawings and the description to refer to the same or like parts.

For the convenience of management, a hard disk in a computer system can be divided into a plurality of partitions and these partitions can be used by different users. The first sector of each partition is usually used for recording related data of the partition, such as the type of a file system, the position of a root directory, the number of sub-directories corresponding to the root directory, and the positions of the sub-directories in the hard disk, etc. The content of the partition cannot be read once the data in the first sector is damaged since the file system has a tree structure. The present invention provides a data protection method based on aforementioned characteristic of file system. Embodiments of the present invention will be described below with reference to accompanying drawings.

Figure 2:
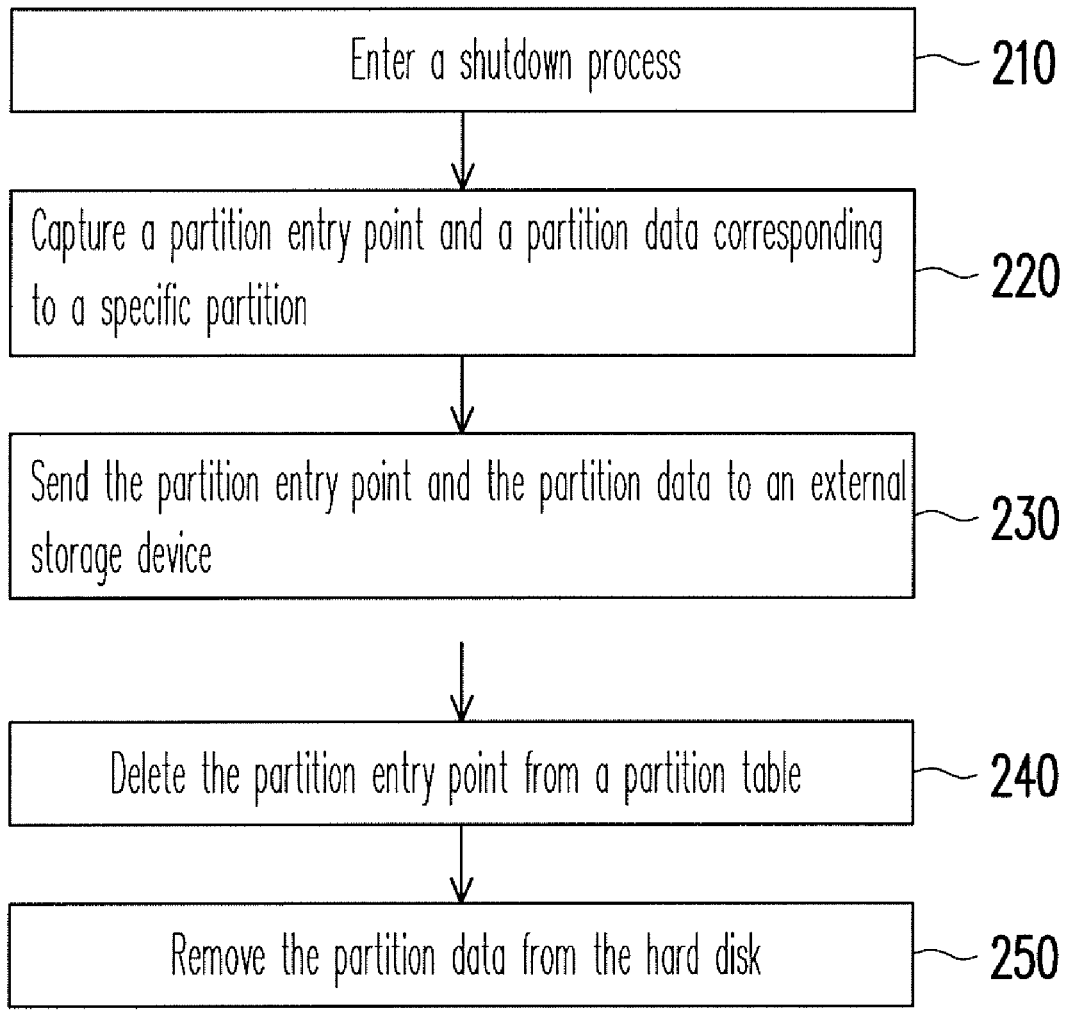
FIG. 2 is a flowchart of a data protection method according to an embodiment of the present invention.

FIG. 2 is a flowchart of a data protection method according to an embodiment of the present invention. In the present embodiment, a plurality of users share the same electronic device, and the electronic device has a storage medium which includes a partition table and a plurality of partitions. For the convenience of description, the electronic device is assumed to be a computer system and the storage medium to be a hard disk in following embodiments.

Assuming that three users A, B, and C have to share the computer system, a computer management person divides the hard disk into four partitions. The partition table in the hard disk records the start position and end position of each partition. Next, the computer management person may set the access rights of the users A, B, and C to each of the partitions through the interface provided by the basic input/output system (BIOS). For the convenience of description, it is assumed herein that the first partition is used for storing shared data (for example, an operating system), accordingly every user can access the data stored in this partition, and the second partition, the third partition, and the fourth partition respectively belong to the users A, B, and C for storing personal files.

The users A, B, and C can log into the computer system by using their own account passwords after the computer management person finishes the setting of the access rights of the users to the partitions. For example, when the computer system receives an account password input by the user A, the computer system allocates the first and the second partitions to be accessed by the user A. When the user A finishes using the computer system, the user A shuts down the computer system or lets it enter a hibernation state. As shown in step 210, the computer system receives an operation of the user A to enter a shutdown process (or a hibernation process).

A partition entry point and a partition data corresponding to the specific partition are then captured in step 220. In the present embodiment, the specific partition may be the partition in the hard disk which is accessible only to the user A (i.e. the second partition). To be more specific, first, the partition entry point of the second partition is obtained from the partition table, and then the partition data recorded in the second partition (for example, the data in the first sector of the second partition) is obtained according to the partition entry point.

Next, in step 230, the partition entry point and the partition data are sent to an external storage device. In the present embodiment, the external storage device may be a flash drive or a floppy disk drive connected to the computer system; however, the scope of the external storage device is not limited in the present invention. It should be mentioned that in the present embodiment, a predetermined symbol, a partition number of the second partition, and a check sum corresponding to the partition data are also sent to the external storage device besides the partition entry point and the partition data.

After the partition entry point and the partition data corresponding to the user A are copied into the external storage device, the partition entry point is removed from the partition table in step 240. As a result, it is impossible to query the start position and end position of the second partition in the hard disk through the partition table.

Finally, in step 250, the partition data originally stored in the hard disk is removed, and the shutdown process (or the hibernation process) is completed. The removing action may include replacing the content of the partition data with the predetermined symbol in the hard disk. As described above, in a file system having a tree structure, the first sector of each partition records the position of a root directory, the number of sub-directories, and the positions of the sub-directories of the partition. Thus, once the data in the first sector is lost, the system cannot determine which data is directory or which data is file. In this case, the system cannot access the partition.

To be more specific, after the user A shuts down the computer system (or lets it enter the hibernation state), the other users cannot see or access any data stored in the second partition even though they can still log into the computer system and perform various operations. Based on the embodiment described above, how the computer system reads the second partition when the user A uses the computer system next time will be described in detail in following embodiment of the present invention.

Figure 3:
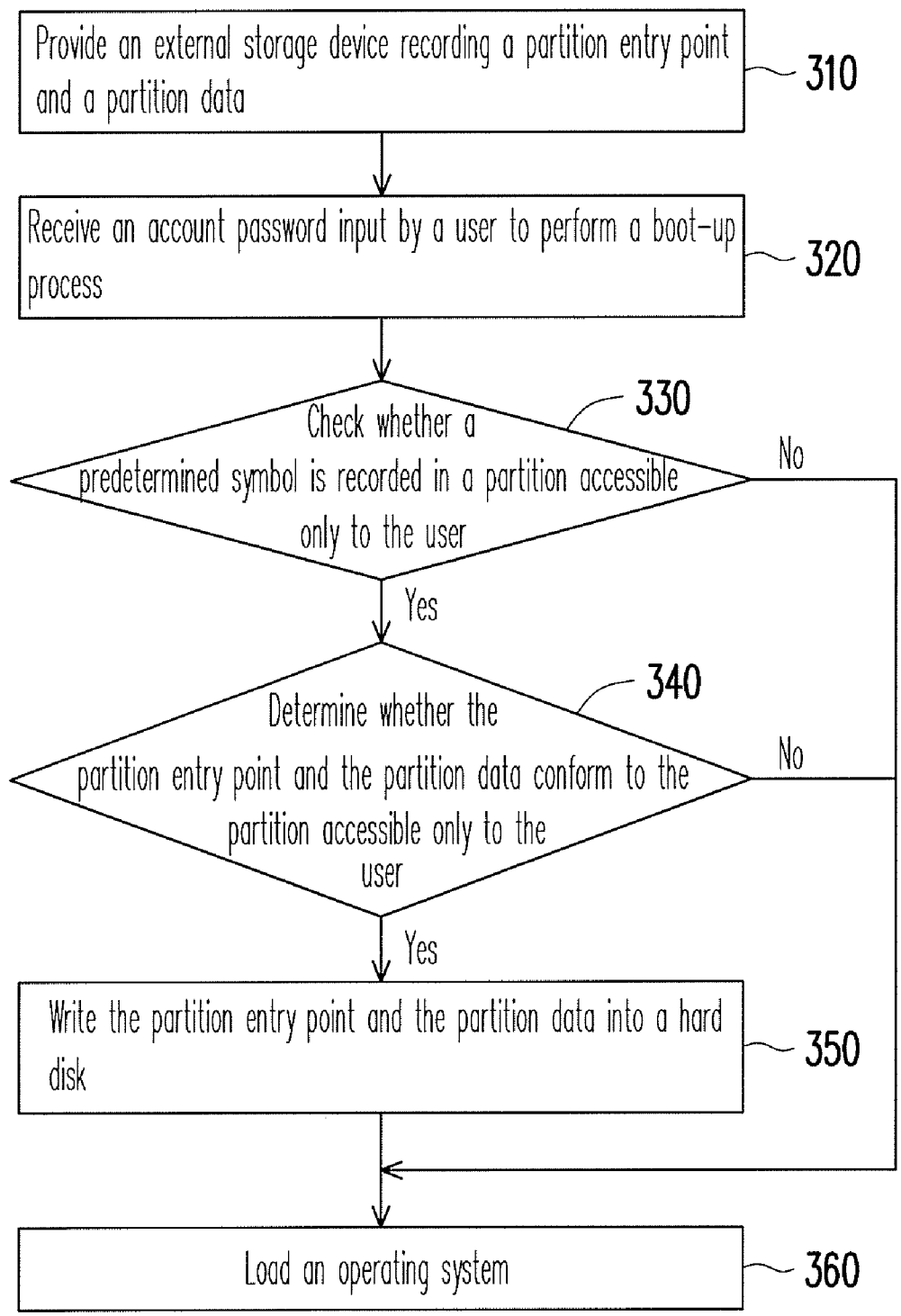
FIG. 3 is a flowchart of a data protection method according to another embodiment of the present invention.

Referring to FIG. 3, first, in step 310, the user has to connect the external storage device (for example, a flash drive) which stores the partition entry point and the partition data to the computer system before the user turns on the computer system. In the present embodiment, the external storage device also records the partition number corresponding to the partition entry point, the predetermined symbol, and the check sum corresponding to the partition data.

Then, in step 320, the computer system receives an account password input by the user A to perform a boot-up process (or a wake-up process). After receiving the account password input by the user A, the computer system determines that the second partition in the hard disk is used for storing personal data of the user A according to the previous setting done by the computer management person. Namely, the second partition can only be accessed by the user A.

Next, in step 330, whether the predetermined symbol is recorded in the second partition which is accessible only to the user A is checked. In the present embodiment, whether the predetermined symbol is recorded in the first sector of the second partition is checked. If the predetermined symbol is not recorded in the second partition, it means that the user A does not executes the data protection method as shown in FIG. 2 when last time the user A turns off the computer system or the hard disk currently accessed is a new hard disk. Thus, in step 360, the computer system carries out a normal boot-up procedure to load the operating system.

It means the user A executes the data protection method when last time the user A turns off the computer system if the predetermined symbol is recorded in the second partition. Then in step 340, whether the partition entry point and the partition data recorded in the external storage device conform to the second partition is determined. Whether the partition entry point and the partition data conform to the second partition may be determined by comparing whether the partition number recorded in the external storage device matches the order of the second partition in the hard disk.

If the partition number recorded in the external storage device does not match the order of the second partition in the hard disk, which means the user A provides a wrong external storage device (for example, an external storage device of another user), in step 360, the computer system loads the operating system and completes the boot-up process. Herein, the user A cannot see or access any data stored in the second partition even though he/she can use the computer system.

If both the partition entry point and the partition data conform to the second partition, the partition entry point and the partition data are written into the hard disk, as in step 350. To be specific, first, the partition entry point is written into the partition table of the hard disk, and the partition data is written into the first sector of the second partition according to the partition entry point. Correctness of the partition data may be checked through cyclic redundancy check (CRC) according to the check sum stored in the external storage device before the partition data is written into the hard disk.

Finally, in step 360, the operating system is loaded into the computer system and the boot-up process is completed. Accordingly, the user A can not only operate the computer system but also access the data stored in the second partition.

Even though a computer system and a hard disk are used as examples in the embodiments described above, the scopes of the electronic device and the storage medium in the present invention are not limited thereto. In other words, any electronic device having a storage medium can be applied in the present invention to achieve the purpose of personal data protection.

In overview, the data protection method provided by the present invention has at least following advantages:

1. according to the characteristic of a file system having a tree structure, when an electronic device having a storage medium is turned off, a partition data and a partition entry point corresponding to a partition which is accessible only to a user are copied into an external storage device, and the partition data and the partition entry point are deleted from the storage medium. Thus, it is ensured that other users cannot access the data in this partition and accordingly data security in the electronic device shared by multiple users can be ensured.

2. an external storage device with only a small capacity is used for storing specific data in order to protect the data from being accessed by other users. Thus, the convenience in data protection is improved.

3. a user has to provide a corresponding external storage device to access the data in the storage medium when next time the user turns on the electronic device. Accordingly, only a user who can provide a specific external storage device can access the data stored in a specific partition. Thus, data security is improved.

4. even if the storage medium is moved into another electronic device, the protected data can only be accessed when the corresponding external storage device is provided. Thus, data security is ensured.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data protection method, for an electronic device having a storage medium, wherein the storage medium comprises at least one partition and a partition table, the data protection method comprising:
   entering a hibernation process or a shutdown process;
   capturing a partition entry point recorded in the partition table and a partition data corresponding to a specific partition;
   sending the partition entry point and the partition data to an external storage device;
   deleting the partition entry point from the partition table; and
   removing the partition data from the storage medium.

2. The data protection method according to claim 1, wherein before the step of entering the hibernation process or the shutdown process, the data protection method further comprises:
   receiving an account password input by a user to log into the electronic device.

3. The data protection method according to claim 1, wherein the specific partition comprises the partition which is accessible only to a user logged into the electronic device.

4. The data protection method according to claim 1, wherein the step of capturing the partition entry point and the partition data corresponding to the specific partition comprises:
   obtaining the partition entry point; and
   obtaining the partition data recorded in the partition according to the partition entry point.

5. The data protection method according to claim 1, wherein the step of removing the partition data from the storage medium comprises:
   replacing a content of the partition data with a predetermined symbol.

6. The data protection method according to claim 5 further comprising:
   sending the predetermined symbol to the external storage device.

7. The data protection method according to claim 1 further comprising:
   sending a partition number of the specific partition to the external storage device.

8. The data protection method according to claim 1 further comprising:
   sending a check sum corresponding to the partition data to the external storage device.

9. A data protection method, for an electronic device having a storage medium, the data protection method comprising:
   providing an external storage device for recording a partition entry point and a partition data;
   receiving an account password input by a user to perform a wake-up process or a boot-up process;
   determining whether the partition entry point and the partition data conform to a partition accessible to the user; and
   overwriting the partition entry point and the partition data into the storage medium when the partition entry point and the partition data conform to the partition.

10. The data protection method according to claim 9, wherein after the step of receiving the account password input by the user, the data protection method further comprises:
    determining the partition accessible only to the user in the storage medium according to the account password.

11. The data protection method according to claim 9, wherein the external storage device further records a partition number corresponding to the partition entry point.

12. The data protection method according to claim 11, wherein the step of determining whether the partition entry point and the partition data conform to the partition accessibly only to the user comprises:
    determining that the partition entry point and the partition data conform to the partition if the partition number conforms to the partition.

13. The data protection method according to claim 9, wherein the step of overwriting the partition entry point and the partition data into the storage medium comprises:
    writing the partition entry point into a partition table of the storage medium; and
    writing the partition data into the partition according to the partition entry point.

14. The data protection method according to claim 9, wherein the external storage device further records a predetermined symbol.

15. The data protection method according to claim 14, wherein after the step of receiving the account password to perform the wake-up process or the boot-up process, the data protection method further comprises:
    checking whether the predetermined symbol is recorded in the partition; and
    determining whether the partition entry point and the partition data conform to the partition accessible only to the user if the predetermined symbol is recorded in the partition.

16. The data protection method according to claim 9, wherein the external storage device further records a check sum corresponding to the partition data.

17. The data protection method according to claim 16, wherein the step of overwriting the partition entry point and the partition data into the storage medium comprises:
    checking the correctness of the partition data according to the check sum.

18. The data protection method according to claim 9, wherein after the step of overwriting the partition entry point and the partition data into the storage medium, the data protection method further comprises:
    loading an operating system.

19. The data protection method according to claim 9 further comprising:
    loading an operating system when the partition entry point and the partition data do not conform to the partition accessible only to the user.

* * * * *